H. F. Read,
Anti-Friction Roller.
No. 20,683.      Patented June 22, 1858.
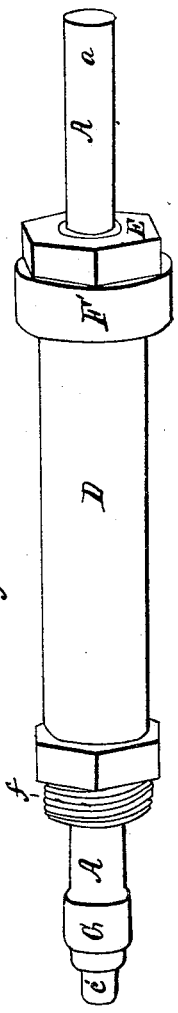
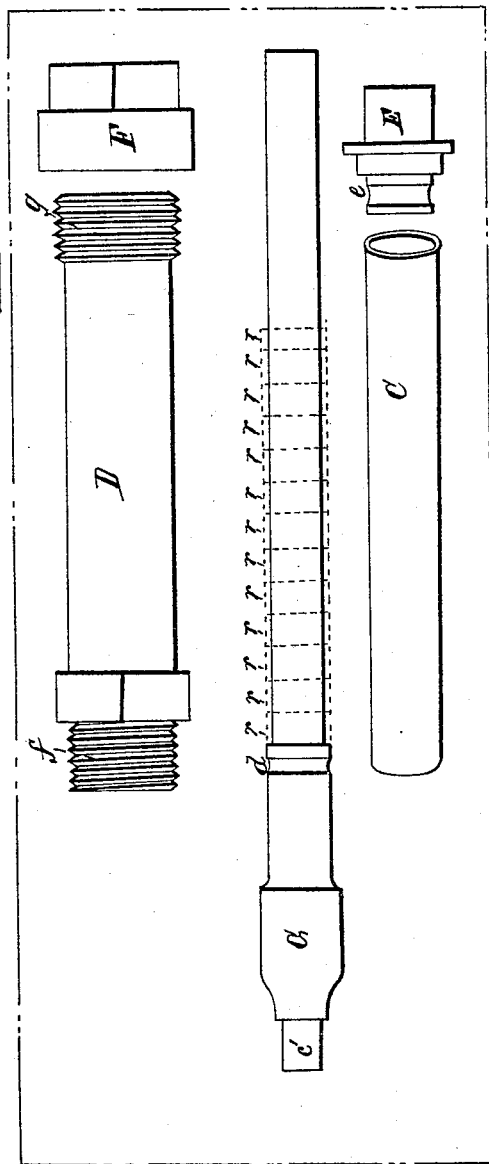
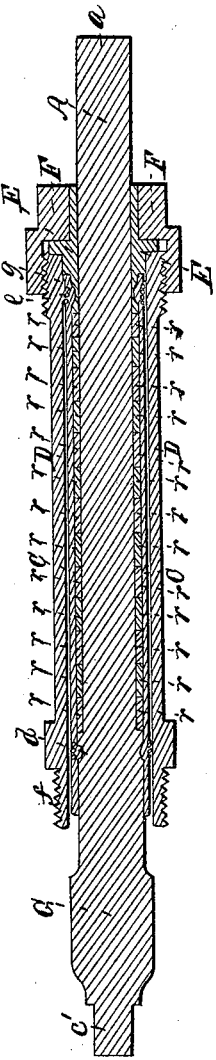
Witnesses.
J. G. Morgan
H. M. Waterman
Inventor.
H. F. Read

UNITED STATES PATENT OFFICE.

H. F. READ, OF BROOKLYN, NEW YORK, ASSIGNOR TO HIMSELF AND SAMUEL J. BURR, OF SAME PLACE.

STUFFING-BOX.

Specification of Letters Patent No. 20,683, dated June 22, 1858.

*To all whom it may concern:*

Be it known that I, HENRY F. READ, of the city of Brooklyn, county of Kings, and State of New York, have invented a new and useful Improvement in Stuffing-Boxes and which I denominate an "Antifriction Stuffing-Box;" and I do declare the following to be a full, clear, and exact description of the construction and operation of the same, reference being had to the annexed drawings, making a part of this specification, in which—

Figure 1 is a perspective view; Fig. 2, is a view showing the various parts of the machine, and Fig. 3 is a sectional view—reference being also had to the letters upon said drawings.

To enable others skilled in the art, to make and use my invention, I will proceed to describe its construction and operation.

A is the shaft; "$a$" is the place where the attachment is made to the shaft A, for the purpose of turning said shaft, to and from, or giving thereto any other desired motion; "$r, r, r$" series of metallic rings, made of any suitable material, surrounding the shaft A, and loosely fitted thereto; and placed inside of the flexible tube C, and between the fastenings of said tube at each end. C, a flexible tube, made of india rubber or any other suitable material, covering the rings "$r, r, r$," and which tube is held at "$d$" on the shaft, and at "$e$," on the thimble, by being fastened with wire or other suitable material. D, a metallic tube or casing, having a screw on each end—one at "$f$," to attach to a valve chest, or wherever the attachment may be required; and the other at "$g$," to receive the cap F. E, a thimble, made with a shoulder to fit the end of the metallic tube or casing D, at "$g$." F, the cap, so constructed as to cover and secure the thimble E, on the end of the metallic tube or casing D. G, place where any suitable contrivances attached to the shaft A, for the purpose of changing valves or making any other movement that may be desired, through the means of a stuffing box. "$c$," journal of the shaft A.

Any mechanical device of proper construction for moving the shaft A, is attached thereto at "$a$," and so arranged as to turn or move the shaft the required distance. The moving of the shaft, communicates motion to any proper device attached to shaft A, at G, whether for the purpose of throwing valves or communicating any required movement to other machinery.

The tube or casing D, being permanently fastened, the cap F, is likewise permanent, as also the end of the flexible tubing C, at "$e$," where it is attached to the thimble E,—the thimble being securely held by the cap F; but the other end of the flexible tube C, being attached at "$d$," to the shaft A, moves therewith as said shaft is moved, causing the rings to move a portion of the divided distance, according to the number of the rings; and protecting the shaft and flexible tubing from contact and friction with each other, so that no matter what may be the pressure upon the flexible tubing, it adds nothing to the friction upon the shaft, said shaft being completely protected by the metallic rings.

What I claim and desire to secure as my invention, is—

1. The metallic rings "$r, r, r$," placed upon the shaft A, for the purpose of protecting from friction, the shaft and flexible tube C, within which said rings are placed.

2. The arrangement of the flexible tube on the outside of metallic rings, so as to allow said flexible tubing to give or twist equally its whole length; and also, to carry with it each ring a proportionate distance according to the distance traveled by the shaft.

3. In combination as described, the thimble E, as used for the purpose of packing the joint at the end "$g$," of the outside case D, and at the same time holding permanently, one end of the flexible tube.

4. The combination of the flexible tubing, and the metallic rings working together on the shaft, together with the metallic casing D, substantially in the manner described and for the purposes set forth.

H. F. READ.

Witnesses:
 J. G. MORGAN,
 H. M. WATERMAN.